United States Patent
Spiegel et al.

[11] 3,736,400
[45] May 29, 1973

[54] APPARATUS FOR DAMMING PIPE ENDS FOR WELDING

[75] Inventors: Jacob Spiegel, Philadelphia, Pa.; Albert Miller, Somerdale, N.J.; Irving Klukoff, Flushing, N.Y.

[73] Assignee: Gilbreth Company, Philadelphia, Pa.; by said Miller and Klukoff

[22] Filed: Aug. 31, 1971

[21] Appl. No.: 176,628

[52] U.S. Cl. .................. 219/60 A, 29/155, 219/74, 219/137, 228/50
[51] Int. Cl. ............................................. B23k 9/02
[58] Field of Search ................ 219/60 A, 60 R, 61, 219/74, 75, 137; 228/50; 229/DIG. 30, 158

[56] References Cited

UNITED STATES PATENTS

| 2,802,092 | 8/1957 | Hauck | 219/61 |
| 1,126,710 | 2/1915 | Conry | 220/DIG. 30 |
| 3,347,297 | 10/1967 | Garland | 220/DIG. 30 |
| 2,654,014 | 9/1953 | Schaefer | 219/60 R |
| 2,320,700 | 6/1943 | Kent et al. | 219/137 X |
| 2,882,385 | 4/1959 | Lyons | 219/74 |

Primary Examiner—C. L. Albritton
Assistant Examiner—L. A. Schutzman
Attorney—Caesar, Rivise, Bernstein & Cohen

[57] ABSTRACT

A method and apparatus for welding together a pair of pipe ends. The method comprises providing a water soluble dam at each pipe end, inserting an inert gas into the ends between the dams, welding the ends together and passing a fluid containing water through the pipe to dissolve the dam.

6 Claims, 15 Drawing Figures

Patented May 29, 1973

Inventors
JACOB SPIEGEL
ALBERT MILLER
IRVING KLUKOFF

By: Caesar, Rivise, Bernstein & Cohen

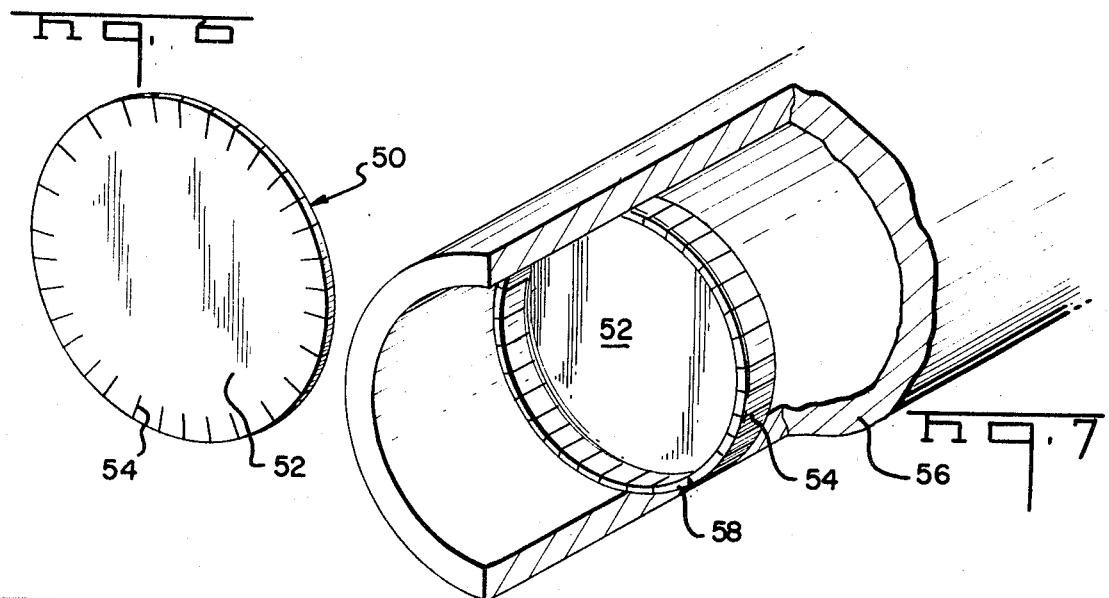
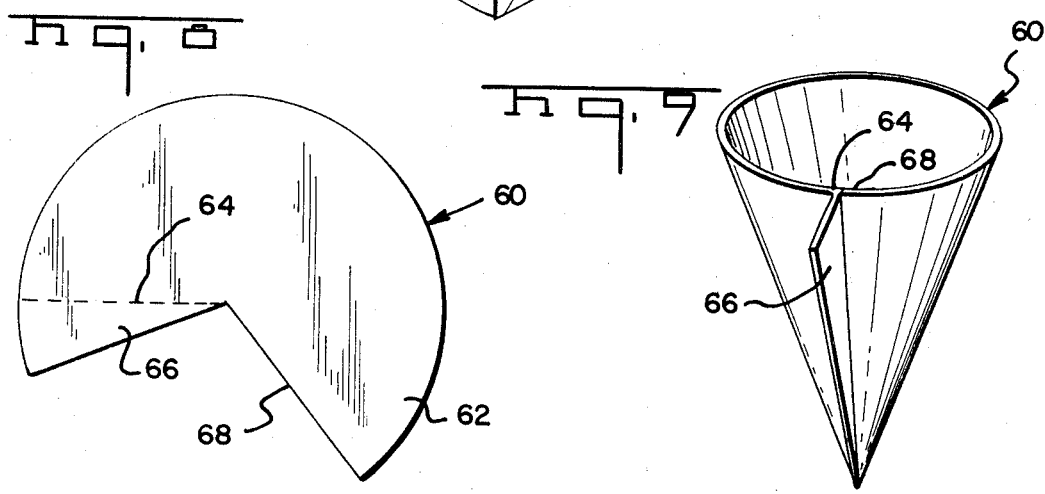
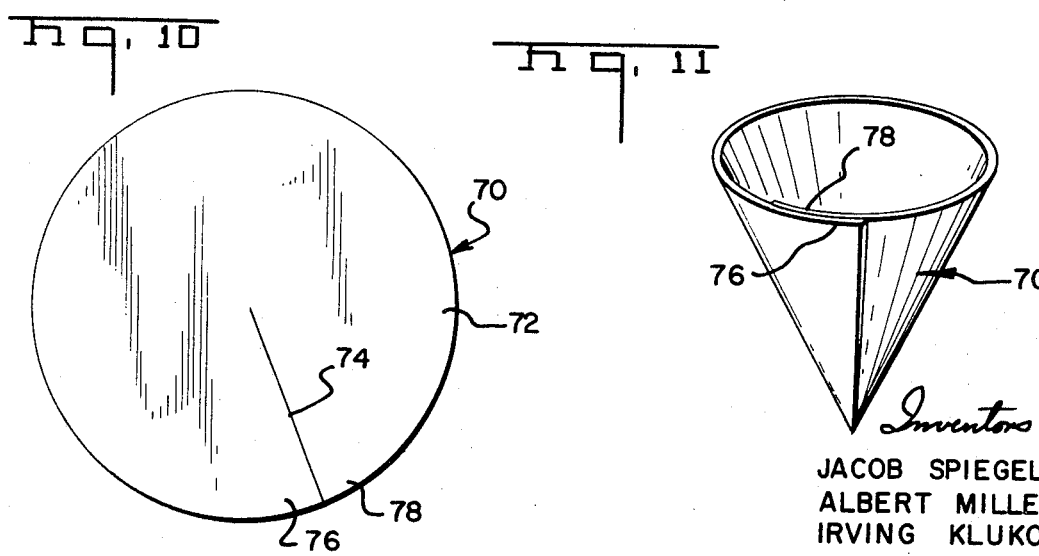
Inventors
JACOB SPIEGEL
ALBERT MILLER
IRVING KLUKOFF
By: Caesar, Rivise, Bernstein & Cohen Inventors
JACOB SPIEGEL
ALBERT MILLER
IRVING KLUKOFF By: Caesar, Rivise, Bernstein & Cohen

APPARATUS FOR DAMMING PIPE ENDS FOR WELDING

This invention relates generally to welding pipes and more particularly to a method of welding together a pair of pipe ends by using a water soluble dam during the welding of the ends together.

In conventional gas tungsten-arc welding, an inert atmosphere is usually required inside the pipe to enable evacuation of the air in the pipe. An inert atmosphere is also required around the welding electrode. Without the provision of an inert atmosphere, oxidation is substantially impossible to prevent and, thus, incomplete fusion of the pipe edges is frequently caused. In the welding of steel pipe this is particularly true. In order to maintain the inert gas within the pipe adjacent the welded section, a temporary dam must be provided to contain the inert gas within the welding area. Since the pipe is normally long, the dam cannot be physically removed after the completion of the welding so that some other means must be used to remove it. In the past, this was often accomplished by using paper or cardboard dams which were placed in each end of the pipe and, after the welding was completed, a long piece of paper or cardboard connected to each of the dams as a fuse was ignited in order to burn out the paper dams. The paper fuses extended through the pipes to an accessible position. However, this prior method proved unsatisfactory in three ways. First, the paper fuse was often so long that the flame died out along the route of the fuse to the dam and the paper dam was not ignited. Secondly, the combustion of the paper dam was often not complete as a result of a lack of oxygen in the pipe or the failure to place the flame close enough to the dam. Thirdly, one or both of the pipes had no open end after welding to enable the fuse to be ignited.

It is, therefore, an object of the invention to overcome the aforementioned disadvantages.

Another object of the invention is to provide a new and improved method of welding together a pair of pipe ends which enables a dam, used for providing an inert environment, to be completely removed after the ends have been welded together.

Yet another object of the invention is to provide a new and improved apparatus to enable welding of pipe which includes a water soluble dam.

Still another object of the invention is to provide a new and improved method and apparatus for welding pipe which is inexpensive and facilitates the removal of dams provided in the pipe to enable welding.

These and other objects of the invention are achieved by providing a new and improved method and apparatus for welding pipe. The method comprises the steps of providing a water soluble dam in each pipe end, inserting an inert gas introduced into the ends between the pipes. The ends are welded together and a fluid is then provided which contains water and is passed through the pipe to dissolve the dams. The fluid preferably comprises either steam or water.

Other objects and many of the attendant advantages of this invention will be readily appreciated as the same becomes better understood by reference to the following detailed description when considered in connection with the accompanying drawings wherein:

FIG. 6 is a top plan view of a water soluble paper blank which is used to form an alternate embodiment of the dam;

FIG. 7 is a perspective view with sections removed of said alternate embodiment of said dam in a pipe section;

FIG. 8 is a top plan view of a blank of water soluble paper which is used to form a second alternate embodiment of a dam;

FIG. 9 is a perspective view of the second alternate embodiment of the dam formed of the blank in FIG. 8;

FIG. 10 is a top plan view of a blank made of water soluble paper for forming a third alternate embodiment of a dam;

FIG. 11 is a perspective view of said third alternate embodiment of a dam;

Referring now in greater detail to the various figures of the drawing, wherein like reference numerals refer to like parts, a method of welding together a pair of pipe ends is shown generally at 20 in FIG. 1.

Figure 1:
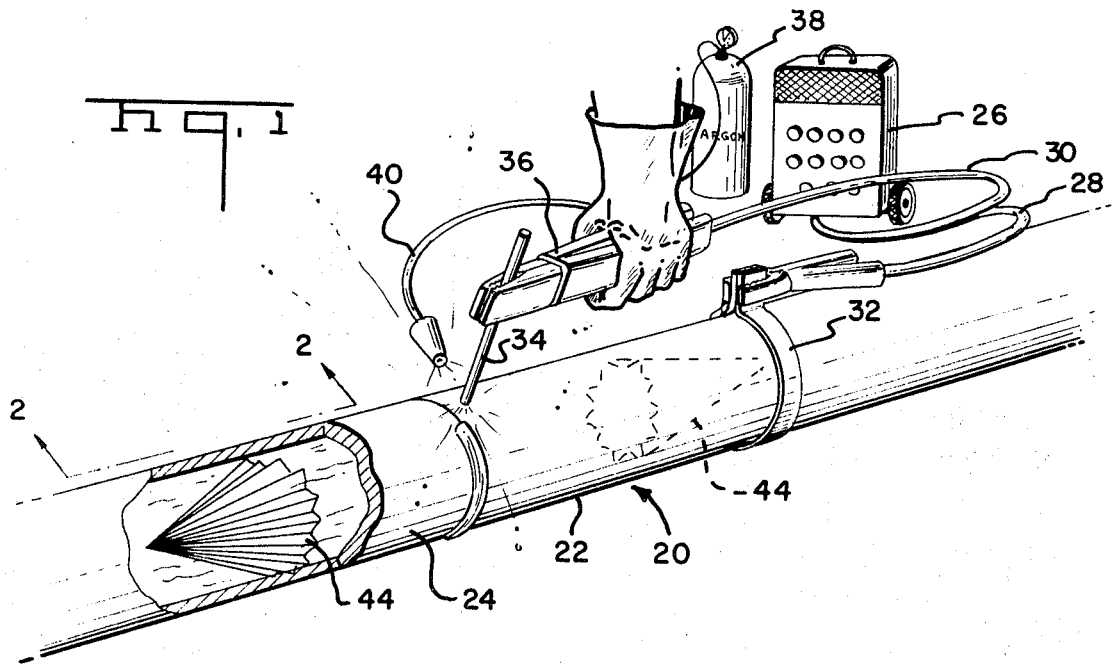
FIG. 1 is a perspective view of a pair of pipe ends being welded together with sections removed for purposes of clarity.

A pair of pipe ends 22 and 24 are shown being welded by use of the tungsten-arc welding process. The voltage source 26 is connected by a pair of leads 28 and 30 to a pair of electrods 32 and 34, respectively. The electrode 32 is in the form of a collar which is securely strapped to the pipe section 22 and which is in electrically conductive contact therewith.

The electrode 34 is connected to the conductive lead 30 via a clipping handle 36 which is held adjacent the pair of pipe ends 22 and 24 at the junction therebetween to cause welding of the pipes together. A source of inert gas 38 is provided which is connected via a tube 40 to provide an inert gas around the electrode 34. The inert gas preferably comprises Argon.

Figures 2, 3:
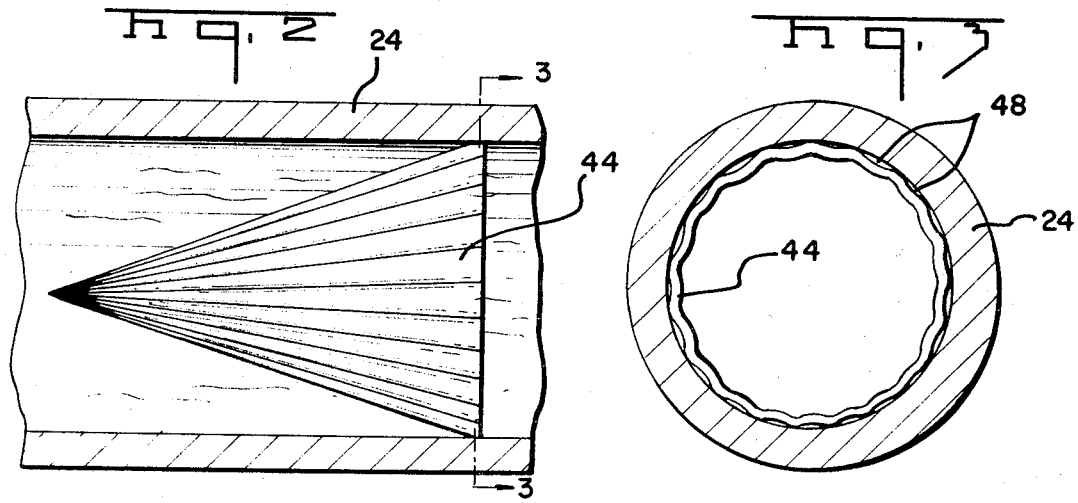
FIG. 2 is an enlarged sectional view taken along the line 2—2 in FIG. 1 with a water soluble dam embodying the invention shown in full.
FIG. 3 is a sectional view taken along the line 3—3 in FIG. 2.
Figures 4, 5:
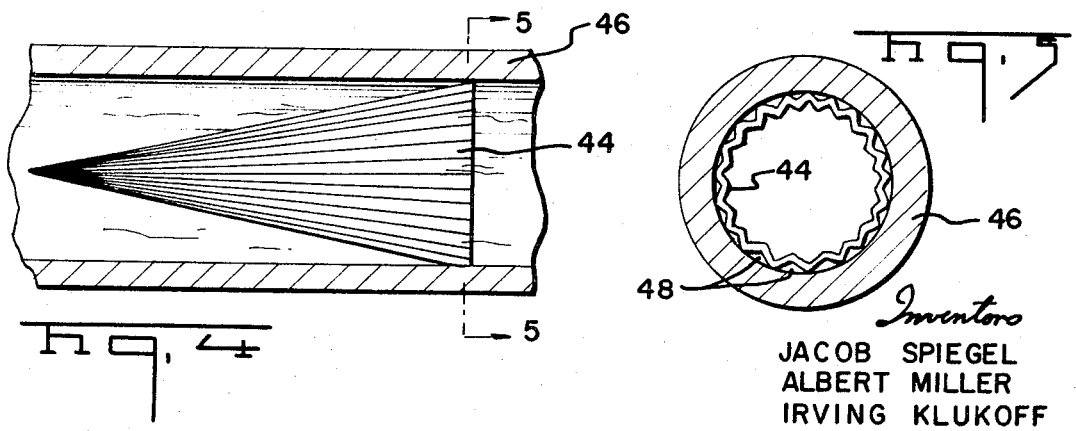
FIG. 4 is a sectional view similar to FIG. 2 of the soluble dam in a pipe of narrower diameter than the pipe in FIG. 2.
FIG. 5 is a sectional view taken along the line 5—5 in FIG. 4.

Provided within each of the pipe ends 22 and 24 is a water soluble dam 44. As best seen in FIGS. 2 and 3, the water soluble dam 44 basically comprises a sheet of water soluble paper which is folded into a conical form having accordian pleated sides. That is, dam 44 is basically formed of a circular blank of water soluble paper which includes fold lines radiating from the center and having accordian pleats folded about the fold lines. As seen in FIGS. 2 and 4, the conically shaped dam 44 fits not only a pipe of large diameter such as pipe 24 shown in FIGS. 1, 2 and 3 but also a pipe of a smaller diameter such as pipe 46 in FIGS. 4 and 5.

The water soluble paper which forms the dams 44 is preferably made in accordance with the process shown in U.S. Pat. No. 3,431,166 issued on Mar. 4, 1969 to Yasuo Mizutani et al. using papermaking fibers and cellulose-glycolic acid.

The dams 44 are placed in the pipe ends 22 and 24 prior to the welding of the junction between the two pipes. Thus, the dams 44 are placed within the pipe ends prior to the placement of tube 40 adjacent the junction of pipe ends 22 and 24.

After the tube 40 is placed adjacent the junction, the inert gas causes the air within the portion of the pipes between the dams 44 to be forced out of the pipe. The tube 40 is so aimed at the junction that the inert gas is constantly being urged into the junction of the pipes and thereby causes the flow of fluids around the edges of the conically shaped dam 44. Thus, as seen in FIG. 3, the openings 48 first act to enable the escape of air and then a slight escape of inert gas. The openings 48, thus, facilitate the removal of air and also inhibit movement of the dams.

After a weld has been made completely around the junction between the pipe ends 22 and 24, water or steam is passed through pipes 22 and 24 and thereby dissolves the dams 44. The dissolving of dams 44, thus, provides an open pipe with no restrictions therein.

An alternate form of dam is shown at 50 in FIG. 8. The dam 50 basically comprises a circular blank 52 having a plurality of radially extending slits 54 which are provided about the entire periphery of the blank 52 spaced from the center and extending to the periphery of the blank. As best seen in FIG. 9, the dam 50 fits within a pipe section 56 by bending each of the sections 58 between the slits 54 transversely to the plane of blank 52. The dam 50 is then placed within the pipe section so that the major and/or planar portion of the blank 52 extends transversely to the axis of the pipe.

The dam 50 is similar to the dam 44 in that the dam 50 is also comprised of water soluble paper and is, thus, dissolvable by the passage of water or steam after the welding of the pipe end has taken place.

Referring to FIGS. 8 and 9, a second alternate form of dam is shown generally at 60. Basically dam 60 comprises a paper blank 62 of water soluble paper which is substantially circular with a sector of the circular blank 62 removed. A radially extending fold line 64 is provided about which a portion or sector 66 is folded. As best seen in FIG. 9, when a conical shape is formed with the blank 60, fold line 64 is disposed adjacent edge 68 and sector 66 extends radially from the conical form. The sector 66 is then folded down against the end of the blank 62 adjacent edge 68 and is adhesively secured thereto to form the dam.

A third alternate embodiment of the dam is shown in FIG. 10 at 70 and basically comprises a circular blank 72 of water soluble paper having a radially extending slit 74. The dam is formed by overlapping ends 76 and 78 about the slit 74. Thus, not only is a conically formed dam 70 formed, but since the ends 76 and 78 may overlap each other in an adjustable fashion, the dam 70 can fit a plurality of sizes of pipe.

Figure 12:
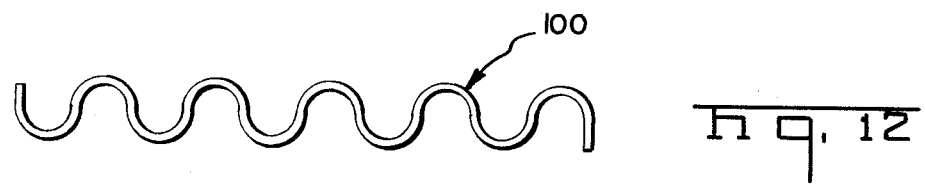
FIG. 12 is a sectional view of a section of water soluble paper which is fluted for the purpose of strengthening the water soluble paper.
Figure 13:
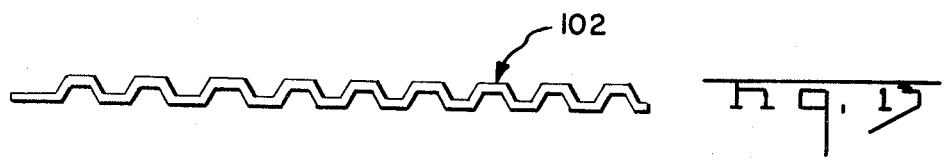
FIG. 13 is an enlarged sectional view of an alternate water soluble paper having a second type of fluting.

While a flat blank of water soluble paper may be used for any of the above dams, it may be preferable to use a water soluble paper which is of a more stiff form. A first type of stiffening used for water soluble paper is that shown in FIG. 12 wherein a sheet of water soluble paper 100 is fluted to cause the paper to be in a sinusoidal or half circular type of cross-section. A second type of fluting is shown in FIG. 13 wherein sheets of water soluble paper 102 are formed by fluting the paper in a trapezoidal cross-section.

Figure 14:
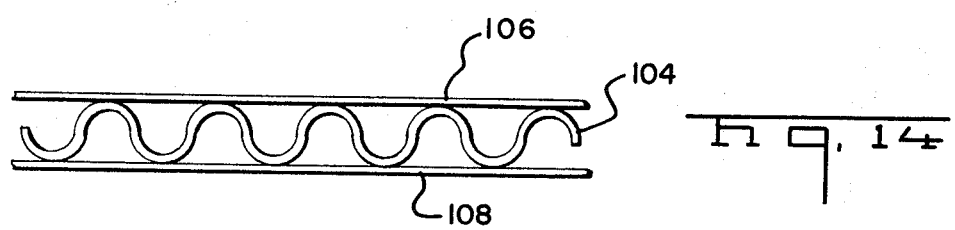
FIG. 14 is a sectional view of corrugated cardboard made of water soluble paper.

The fluted water soluble paper can also be utilized for forming corrugated cardboard made of water soluble paper. Thus, for example, in FIG. 14, the water soluble paper 104 is of a cross-section similar to that shown in FIG. 12. In addition, flat sheets of water soluble paper 106 and 108 are secured to apposing faces of the paper 104 to sandwich the same. A water soluble adhesive is used for securing sheets 106 and 108 to opposite faces of the fluted sheet of water soluble paper 104.

Figure 15:
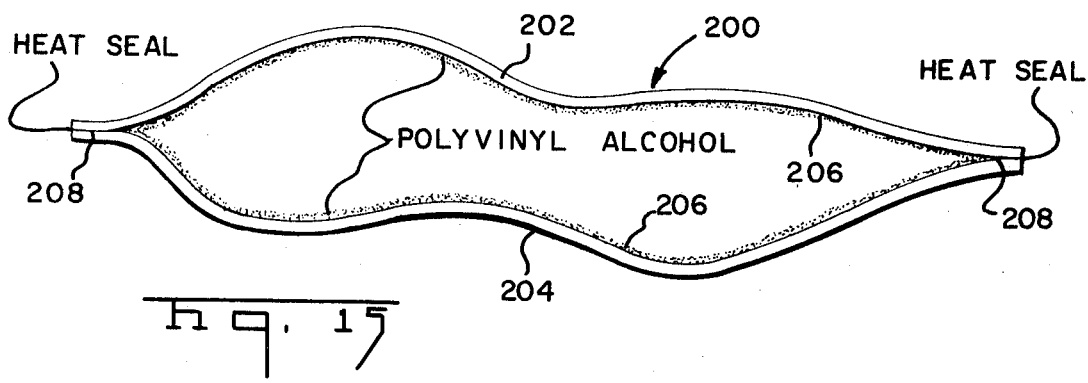
FIG. 15 is a vertical sectional view of a fourth alternate embodiment of a dam.

FIG. 15 shows a fourth alternate embodiment of a dam which basically comprises a flexible bag 200. The bag 200 is formed of water soluble paper sheets 202 and 204, each of which is coated on the interior surface with water soluble material 206, such as polyvinyl alcohol. The two sheets of water soluble paper 202 and 204 are filled with air and the periphery of the material is heat sealed at the periphery 208. A bag is, thus, formed having a somewhat indeterminate shape which can be made to conform to various irregular shapes so that pipe sections having irregular cross-section can be stuffed with the dam 200 formed of a water soluble bag.

It can, therefore, be seen that a new and improved method and apparatus for welding pipe has been shown. The method of welding the pipe is improved by providing a water soluble dam which is easily removed by passing a liquid containing water through the pipe after the welding has taken place. The soluble dam is suitable for maintaining the Argon between the pipe ends adjacent the welding junction so that an inert atmosphere surrounds the welding junction. Moreover, the preferred embodiment of the dam 44 effectively maintains the inert atmosphere between the ends of the pipe and since it is water soluble, is easily removed after a liquid containing water, such as steam or water itself, is passed through the pipe.

It should be understood that, in addition to the preferred embodiments of the dams, a dam embodying the invention may be made by taking a sheet of water soluble paper and joining the same into a pipe end to form a dam. The dam would be removed by steam or water in the same manner as the other embodiments of the dams.

Without further elaboration, the foregoing will so fully illustrate our invention that others may, by applying current or future knowledge, readily adapt the same for use under various conditions of service.

We claim:

1. Apparatus for enabling the welding of a pair of tubular pipe ends having interior peripheral surfaces, by establishing a space within said pipe ends and contiguous therewith into which an inert gas is provided, said apparatus comprising a dam in each of said pipe ends, each of said dams including a peripheral edge in contact with the interior surface of the associated pipe end and being formed of a water soluble paper to enable the removal of said dams by passing a fluid containing water through said pipe ends after said ends have been welded.

2. The apparatus of claim 1 wherein said dams are each conically shaped having accordian pleated side walls to enable said dam to be utilized in a large plurality of sizes of pipes.

3. The apparatus of claim 1 wherein each dam is formed of a circular blank having a plurality of radially extending slits, said dam having a circular planar central portion and a peripheral transversely extending skirt.

4. The apparatus of claim 1 wherein said dam is formed of a blank which is circular yet which includes a sector opening and a radially extending fold line forming a sector tab, said tab adhesively securing the edges of said blank to form a conical dam.

5. The apparatus of claim 1 wherein each dam is formed of a circular blank having a radially extending slit, said blank having a pair of ends which are overlapped to form a conically shaped dam which is adjustable to conform to various diameters of pipe.

6. The apparatus of claim 1 wherein each dam is formed of a closed bag having water soluble paper walls, said bag being conformable to a variety of shapes so that it can be stuffed into a pipe end of irregular shape.

* * * * *